(12) United States Patent
Haubennestel et al.

(10) Patent No.: US 6,512,058 B1
(45) Date of Patent: Jan. 28, 2003

(54) METHOD OF PRODUCING MODIFIED VINYL ETHER POLYMERS

(75) Inventors: Karlheinz Haubennestel, Wesel (DE); Alfred Bubat, Wesel-Bislich (DE)

(73) Assignee: BYJ-Chemie GmbH, Wesel (DE)

( * ) Notice: Subject to any disclaimer, the term of this patent is extended or adjusted under 35 U.S.C. 154(b) by 0 days.

(21) Appl. No.: 09/531,584

(22) Filed: Mar. 21, 2000

(30) Foreign Application Priority Data

Mar. 26, 1999 (DE) .......................................... 199 13 725

(51) Int. Cl.[7] .............................. C08F 8/00; C08F 16/12
(52) U.S. Cl. ........................ 525/362; 525/364; 525/370; 525/371; 525/384; 525/328.9
(58) Field of Search ................................ 525/362, 364, 525/370, 371, 384, 328.9

(56) References Cited

U.S. PATENT DOCUMENTS

| 5,519,089 A | * | 5/1996 | Okamoto et al. ............ 525/123 |
| 5,637,630 A | * | 6/1997 | Atkins et al. ................ 523/523 |
| 5,739,251 A | * | 4/1998 | Venham et al. ......... 252/182.18 |

FOREIGN PATENT DOCUMENTS

| EP | 117174 | | 8/1984 | ......... C08F/230/02 |
| EP | 0379166 | | 7/1990 | ......... C08F/216/14 |
| EP | 0538685 | | 4/1993 | ......... C07C/69/708 |
| EP | 538691 | * | 4/1993 | |
| JP | 59055845 | | 3/1984 | ........... C07C/43/17 |
| WO | WO-92/05135 | | 4/1992 | ........... C07C/43/17 |

OTHER PUBLICATIONS

Chemlist, American Chemical Society, Registration No. 101484–78–0.*

McKeon, J.E. ,et al. ,"The Palladium (II) Catalyzed Vinyl Interchange Reaction—I", *Tetrahedron, 28,* (1972),pp. 227–232.

McKeon, J.E. ,et al.,"The Palladium (II) Catalyzed Vinyl Interchange Reaction—II", *Tetrahedron, 28,* (1972),pp. 233–238.

Smith, M.A. ,et al. ,"A Facile Synthesis of Low and High Molecular Weight Divinyl Ethers of Poly(Oxyethylene)", *Polymer Preprints, 28,* (1987),pp. 264–265.

* cited by examiner

*Primary Examiner*—D. R. Wilson
(74) *Attorney, Agent, or Firm*—Schwegman, Lundberg, Woessner & Kluth, P.A.

(57) ABSTRACT

This invention relates to a method of producing modified vinyl ether polymers, wherein vinyl ether polymers comprising recurring units of general formula (I)

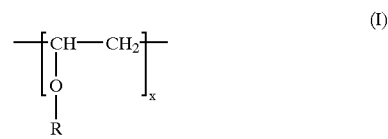

where R represents a $C_2$–$C_4$ alkyl group and x denotes an integer from 10 to 1000, are partially transetherified with compounds of general formula Y—OH, wherein Y represents aliphatic and/or cycloaliphatic hydrocarbon groups comprising 5 to 30 carbon atoms, the hydrogen atoms of which can be replaced at least in part by halogen atoms and/or aryl radicals, and/or represents aliphatic, cycloaliphatic and/or aromatic groups with a molecular weight of up to 6000 which contain at least one ether group —O— or an ester group —COO— within the molecule, in the presence of compounds of the platinum metals with the release of the corresponding $C_2$–$C_4$ alcohols, wherein statistically at least one R radical is replaced by a Y radical per molecule of vinyl ether polymer.

20 Claims, No Drawings

METHOD OF PRODUCING MODIFIED VINYL ETHER POLYMERS

A method of producing modified vinyl ether polymers

The present invention relates to a method of producing modified vinyl ether polymers.

Polyvinylalkyl ethers are interesting polymers which can be used in diverse ways, e.g. as additives in electrodeposition paints, as flow enhancers in powder coatings, as adhesives for paper, as thickeners for aqueous systems, as plasticisers for resins and as care media for floors.

These homopolymers are preferably produced by cationic polymerisation, since radical-initiated polymerisation results in poor yields.

$C_2-C_4$ alkylvinyl ethers are preferably used for homopolymerisation, since these monomers are commercially available on a large scale.

Modifications of these homopolymers would be more suitable for certain applications. For example, polybutylvinyl ethers are not compatible with water and can only be converted into an emulsion via external emulsifiers or by complicated procedures such as those described in EP-A-0 379 166. The production of modified vinyl ether polymers is only possible with restrictions, since corresponding monomers are only obtainable to a limited extent. The transetherification of monomeric vinyl ethers with replacement of the alkyl group in order to produce new monomeric vinyl ethers is in fact described in the literature (McKeon, J. E.; Filton, P.; Griswald, A. A.; Tetrahedron 28, 227 (1972) and 28, 233 (1972); M. A. Smith, K. B. Wagener, Polymer Preprints 28, 264 (1987); J. P. 59055845A2840331 (1984), EP 92 117 174). Despite this, the vinyl ethers which are described in these literature references are not commercially available on a large scale.

It is the object of the present invention to identify a method which provides ease of access to modified polyvinylalkyl ethers. The expression "modified" should be understood here, for example, to be the introduction of hydrophilic groups which improve the compatibility with water. It is also possible by the method according to the invention, however, to introduce other functional or reactive groups into the vinyl ether polymers used as starting materials, in order to change the properties thereof. In this manner, modified vinyl ether polymers can be produced which are not obtainable by the polymerisation of corresponding monomers.

Surprisingly, this object has been achieved by subjecting unmodified polyalkylvinyl ethers to a transetherification reaction in which the alkyl radicals of the polymer are partially replaced by other groups. Examples of transetherification components which can be used in the method according to the invention include saturated aliphatic alcohols such as tridecyl alcohol, lauryl alcohol, stearyl alcohol and behenyl alcohol, unsaturated aliphatic alcohols such as oleyl alcohol, 1-undecanol and 1-hexenol, and araliphatic alcohols such as benzyl alcohol and phenylethanol.

The present invention therefore relates to a method of the type described before, wherein vinyl ether polymers comprising recurring units of general formula (I)

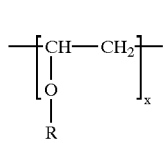

where R represents a $C_2-C_4$ alkyl group and x denotes an integer from 10 to 1000, are partially transetherified with compounds of general formula Y—OH, wherein Y represents aliphatic and/or cycloaliphatic hydrocarbon groups comprising 5 to 30 carbon atoms, the hydrogen atoms of which can be replaced at least in part by halogen atoms and/or aryl radicals, and/or represents aliphatic, cycloaliphatic and/or aromatic groups with a molecular weight of up to 6000 which contain at least one ether group —O— or an ester group —COO— within the molecule, in the presence of compounds of the platinum metals with the release of the corresponding $C_2-C_4$ alcohols, wherein statistically at least one R radical is replaced by a Y radical per molecule of vinyl ether polymer.

0.5 to 25 mol % of the R radicals are preferably transetherified. 1 to 15 mol % of the R radicals are more preferably transetherified, and 2 to 10 mol % of the R radicals are most preferably transetherified.

Even though the transetherification of monomeric vinyl ethers has been described, i.e. the transfer of the vinyl group of a vinyl ether or divinyl ether to the OH group of another alcohol, it has not proved possible to find any reference to the transetherification of polymeric vinyl ethers. The success of this transetherification reaction of polymeric vinyl ethers is surprising, particularly since the transetherification of unsaturated vinyl ethers, which is described in EP-A-0 538 681 for example, is often conducted in saturated ethers such as diethyl ether, ethylene glycol ether, propylene glycol ether or butylene glycol ether, using the same catalysts which are used in the method according to the present invention (EP 0 538 681).

Compounds from the category of the platinum metals are used as catalysts, most preferably compounds of platinum, palladium, rhodium, ruthenium or mixtures thereof. Platinum metal catalysts are most preferably used, such as hexachloroplatinic acid and Speier's catalyst. Chelates of platinum compounds are also suitable, such as those of 2,2-bipyridine and phenanthroline for example.

Cornmercially available polyvinylalkyl ethers with different molecular weights, such as polyvinylethyl ethers (Lutonal® A 25) or polyvinylisobutyl ethers (Lutonal® I 30 or Lutonal® I 60), are used as starting materials, i.e. as vinyl ether polymers comprising recurring units of formula I.

However, $C_2-C_4$ polyvinylalkyl ethers with different molecular weights and different compositions of their alkyl radicals, which are produced by cationic polymerisation by known methods, can also be used for the method according to the invention.

Alkali-free aliphatic, cycloaliphatic and/or araliphatic compounds, which each contain 5–30 carbon atoms, can be used as monohydroxy compounds of general formula Y—OH. Mixtures of such compounds can also be used.

Straight chain and branched aliphatic or araliphatic compounds can be used. These can be saturated or unsaturated. Saturated compounds are preferred. Hydrogen atoms can be replaced in part by halogens, preferably by fluorine and/or by chlorine also. If substituted compounds of this type are used, they are preferably aliphatic monoalcohols. Products of this type are commercially available, wherein, as is known to one skilled in the art, the carbon atoms close to the hydroxyl group generally comprise no halogen atoms. Heptadecafluorodecanol or $C_6F_{13}CH_2CH_2OH$ are examples of special fluorinated alcohols. The corresponding commercially available products are often not homogeneous, but are mixtures of different fluorinated compounds such as those which are obtained during industrial synthesis.

Monohydroxy compounds which contain at least one —O— and/or ester group can also be used as monohydroxy compounds of formula Y—OH. These are therefore mono- or polyethers, esters or polyesters, or mixed polyether polyesters. Apart from ether groups, the compound Y—OH can also contain amide groups and urea groups, or can contain amide groups or urea groups on their own. Examples of ester-containing compounds or polyesters are those which can be obtained by the addition of a lactone such as propiolactone, valerolactone, caprolactone or substituted derivatives thereof by means of a monohydroxy starting component. The compounds which are used as starting components include monoalcohols, which advantageously comprise 1–30, preferably 4–14 C atoms, such as n-butanol for example, longer-chain saturated and unsaturated alcohols such as propargyl alcohol, oleyl alcohol, hexenol, oxoalcohols, cyclohexanol, phenylethanol, neopentyl alcohol, and also fluorinated alcohols such as those mentioned above. Alcohols of the type described above, and substituted and unsubstituted phenols, can also be converted, by alkoxylation by known methods with ethylene oxide and/or propylene oxide, into polyoxyalkylene monoalkyl, aryl, aralkyl and cycloalkyl ethers, and these monohydroxy polyethers can be used in the manner described above as starting components for subsequent lactone addition. Mixtures of the aforementioned compounds can also be used in each case.

Said lactone polymerisation can be effected by known methods, and can be initiated by paratoluenesulphonic acid or dibutyltin dilaurate for example, at temperatures from about 100° C. to 180° C.

Examples of compounds which contain at least one ester group include those, such as, n-butyl 6-hydroxycaproate, obtained by the ring opening addition of caprolactone to n-butanol.

These monoesters cannot generally be obtained in a pure state; they occur as mixtures with higher homologues, but can be separated into their individual components by distillation.

Polyesters which have proved to be suitable are those with molecular weights between 350 and 6000, preferably those with molecular weights between 500 and 2000.

Monohydroxy (poly)ethers can also be used as compounds of formula Y—OH, such as methyl glycol, methyl diglycol, ethyl glycol and butyl glycol and higher homologues thereof. Moreover, monohydroxy polyethers can generally be used such as those which are obtained by the alkoxylation of alkanols, cycloalkanols and phenols. These polyethers advantageously have a molecular weight within the range from about 350–1500.

Compounds which contain at least one amide or urea group are those which are obtained by the reaction of oleic acid, for example, with 3-amino-1-propanol to form 3-oleylamido-1-propanol, or those which are obtained by the reaction of phenyl isocyanate, for example, with 9-amino-3,6-dioxanonan-1-ol to form 9-phenylureido-3,6-dioxanonan-1-ol.

When alcohols of industrial quality are used, and particularly when alkoxylates of industrial quality are used, small amounts of difunctional alcohols are present. These difunctional alcohols can be tolerated, even if the molecular weight of the transetherified polyvinyl ethers is increased slightly thereby. In some cases this is even desirable. Excessive crosslinking should be avoided, however, since gel-like products which can no longer be handled are then produced.

Mixtures of Y—OH alcohols can also be used in the transetherification reaction according to the invention, e.g. polyether alcohols in combination with fluoroalcohols.

The transetherification reaction with Y—OH alcohols proceeds, with the use of the catalysts described above, either in a solvent-free system or in suitable solvents which do not themselves take part in the reaction but which make it possible for the alcohols which are released, such as ethanol, propanols or butanols, to be removed from the reaction mixture. This can be assisted by the application of a vacuum. Suitable transetherification temperatures range from 50° C. to 200° C., preferably from 180° C. to 180° C., most preferably from 100° C. to 150° C.

Depending on the temperature employed, on the amount of catalyst and on the degree of transetherification, the time of reaction ranges between about 2 and 10 hours and can be monitored by measuring the alcohol which is distilled off.

The platinum metal catalysts which are used for transetherification can remain in the reaction product, and due to the small amounts used, which range from 0.005 to 0.05 % of active catalyst, do not have an adverse effect on the farther use of the modified polyvinyl ethers. It is also possible, however, to remove platinum metal compounds from the reaction product by means of known adsorption methods, or, if the catalysts are present in heterogeneous form, they can easily be removed after the reaction by a simple filtration procedure. Increasing the proportion of catalyst above the aforementioned amount results in a reduction of the time of reaction, but in most cases this is not recommended due to the high cost of platinum metals.

Modified vinyl ether polymers can be produced in a very simple and economic manner by the method according to the invention, as is shown in Examples 1–14 below.

In the following examples, the production of the compounds according to the invention is described.

EXAMPLE 1

340 g (about 0.1 mol) of a polyvinylethyl ether with a molecular weight of about 3400 (determined by GPC using polystyrene as the standard) were mixed, in a glass flask fitted with a stirrer, thermometer and distillation equipment, with 68 g (about 0.06 mol) of a polyether started from butanol, of average formula $CH_3(CH_2)_3$—$O(C_2H_4O)_{10}$ $(C_3H_6O)_{10}H$, corresponding to a theoretical degree of transetherification of 1.3 mol %, and the mixture was heated to 80° C. After adding 0.024 g hexachloroplatinic acid dissolved in isopropanol, the temperature was increased to 100° C. with the simultaneous application of a vacuum, and the ethanol which was formed was distilled off over four hours. A clear, orange-yellow, viscous product was obtained, which had a hydroxyl number of 2 mg KOH/g. This corresponded to a conversion of about 90%, which was confirmed by further analytical tests by means of GC/MS and $^{13}C$ NMR. The formation of ethanol during the reaction was confirmed by GC/MS analysis. The anticipated structure after the transetherification reaction was verified by $^{13}C$ NMR analysis. The viscosity of the resulting modified polyvinylethyl ether was 1200 mPas at 20° C. The molecular weight of 3700 (determined by GPC using polystyrene as the standard) had increased from 3700 to 4800 compared with the unreacted starting mixture.

The transetherification product was considerably better to emulsify in water compared with a mixture of unconverted reaction components.

Other modified polyvinyalkyl ethers were produced, analogously to Example 1, by reaction with hydroxyfunctional compounds, with catalysis by means of platinum metal compounds (Table 1).

weight of up to 6000 which contain at least one either group —O— or an ester group —COO— within the molecule, in the presence of compounds of the platinum metals with the release of the corresponding $C_2$–$C_4$ alcohols, wherein on the

| Example | Reaction components | Molecular weight | Degree of transetherification [mol %] | Amount of components [g] | Reaction temperature [° C.] | Reaction time [hours] | % of theoretical conversion |
|---|---|---|---|---|---|---|---|
| Example 2 | polyvinylethyl ether<br>$CH_3$—$O(C_2H_4O)_xH$<br>cis-bis-(dibenzylsulphide)platinum II dichloride | 3400<br>350 | 5.1 | 100<br>25<br>0.007 | 140 | 3 | 95 |
| Example 3 | polyvinylethyl ether<br>nonylphenol ethoxylate (7EO)<br>hexachloroplatinic acid | 3400<br>528 | 1.4 | 150<br>15<br>0.01 | 80 | 4 | 93 |
| Example 4 | polyvinylethyl ether<br>butyl triglycol<br>bis-(acetylacetonato)palladium II | 2500<br>206 | 8.7 | 150<br>37.5<br>0.02 | 120 | 2.5 | 91 |
| Example 5 | polyvinylethyl ether<br>octadecanol<br>hexachloroplatinic acid | 3400<br>270 | 2.7 | 200<br>20<br>0.014 | 110 | 4 | 92 |
| Example 6 | polyvinylethyl ether<br>$CF_3(CF_2)_6CH_2CH_2OH$<br>hexachloroplatinic acid | 2500<br>414 | 4.4 | 100<br>25<br>0.008 | 140 | 6 | 90 |
| Example 7 | polyvinylethyl ether<br>benzyl alcohol<br>hexachloroplatinic acid | 3400<br>108 | 6.7 | 150<br>15<br>0.01 | 100 | 4.5 | 96 |
| Example 8 | polyvinylethyl ether<br>hexenol<br>hexachloroplatinic acid | 3400<br>100 | 7.2 | 200<br>20<br>0.015 | 80 | 3.5 | 93 |
| Example 9 | polyvinylethyl ether<br>$CH_3(CH_2)_3$—[$OCO(CH_2)_5$]$_{10}OH$<br>hexachloroplatinic acid | 2500<br>1214 | 1.5 | 200<br>50<br>0.015 | 110 | 2.5 | 97 |
| Example 10 | polyvinylethyl ether<br>[(1-oxo-2-propenyl)oxy]ethyl ester, bis[6-hydroxyhexanoic acid]<br>phenanthroline palladium diacetate | 3400<br>342 | 5.3 | 150<br>37.5<br>0.014 | 80 | 4 | 91 |
| Example 11 | polyvinylisobutyl ether<br>$CH_3(CH_2)_3$—$O(C_2H_4O)_{10}(C_3H_6O)_{10}H$<br>hexachloroplatinic acid | 2500<br>1094 | 2.3 | 150<br>37.5<br>0.012 | 120 | 6 | 89 |
| Example 12 | polyvinylbutyl ether<br>$CH_3$—$O(C_2H_4O)_xH$<br>hexachloroplatinic acid | 3100<br>384 | 2.6 | 200<br>20<br>0.015 | 100 | 5.5 | 90 |
| Example 13 | polyvinylethyl ether<br>3-phenylureido-1-propanol<br>bis-(acetylacetonato)palladium II | 2500<br>194 | 8.7 | 150<br>35.3<br>0.03 | 120 | 6 | 85 |
| Example 14 | polyvinylethyl ether<br>nonylphenol ethoxylate (7EO)<br>hexachloroplatinic acid | 2500<br>528 | 13.6 | 100<br>100<br>0.015 | 140 | 8 | 82 |

*"[(1-oxo-2-propenyl)oxy]ethyl ester, bis[6-hydroxyhexanoic acid]" is the adduct of two moles of ε-caprolactone onto 1 mole of 2-hydroxyethyl acrylate.

What is claimed is:

1. A method of producing modified vinyl ether polymers, wherein vinyl ether polymers comprising recurring units having formula (I)

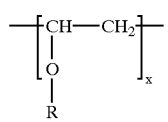

where R represents $C_2$–$C_4$ alkyl group and x denotes an integer from 10 to 1000, are partially transetherified with compounds having the formula Y—OH, wherein Y represents aliphatic and/or cycloaliphatic hydrocarbon groups comprising 5 to 30 carbon atoms, wherein the hydrogen atoms are optionally replaced at least in part by halogen atoms and/or aryl radicals, and/or represents aliphatic, cycloaliphatic and/or aromatic groups with a molecular weight of up to 6000 which contain at least one either group —O— or an ester group —COO— within the molecule, in the presence of compounds of the platinum metals with the release of the corresponding $C_2$–$C_4$ alcohols, wherein on the average at least one R radical is replaced by a Y radical per molecule of vinyl ether polymer.

2. A method according to claim 1, wherein compounds of platinum, palladium, rhodium, ruthenium or mixtures thereof, are used as catalysts.

3. A method according to claim 1, wherein transetherification is conducted at a temperature from 50° to 200° C.

4. A method according to claim 1, wherein 0.5 to 25 mol % of the R radicals are transetherified.

5. A method according to claim 2, wherein transetherification is conducted at a temperature from 50° to 200° C.

6. A method according to claim 2, wherein 0.5 to 25 mol % of the R radicals are transetherified.

7. A method according to claim 3, wherein 0.5 to 25 mol % of the R radicals are transetherified.

8. A method according to claim 5, wherein 0.5 to 25 mol % of the R radicals are transetherified.

9. The method according to claim 1, wherein the vinyl ether polymer is a polyvinyl ethyl ether or a polyvinyl isobutyl ether.

10. The method according to claim 1, wherein the compound having the formula Y—OH is butyl triglycol, octadecanol, $CF_3(CF_2)_6CH_2CH_2OH$, benzyl alcohol, hexenol, $CH_3(CH_2)_3{-}_{10}OH$, $CH_3(CH_2)_3{-}O(C_2H_4O)_{10}(C_3H_6O)_{10}H$, $CH_3{-}O(C_2H_4O)_xH$, 3-phenylureido-1-propanol, nonylphenol ethoxylate, tridecyl alcohol, lauryl alcohol, stearyl alcohol, behenyl alcohol, oleyl alcohol, 1-undecanol, hexenol, benzyl alcohol, phenylethanol, heptadecafluorodecanol, $C_6F_{13}CH_2CH_2OH$, n-butyl 6-hydroxycaproate or ((1-oxo-2-propenyl)ethyl ester, bis(6-hydroxyhexanoic acid.

11. The method according to claim 2, wherein the catalysts is cis-bis-(dibenzylsulphide) platinum II dichloride, hexachloroplatinic acid, bis-(acetylacetonato)palladium II or phenanthroline palladium diacetate.

12. The method according to claim 10, wherein the vinyl ether polymer is polyvinylethyl ether, the compound having the formula Y—OH is $CH_3(CH_2)_3{-}O(_2H_4O)_{10}C_3H_6O)_{10}H$ and the catalyst is hexachloroplatinic acid.

13. A method according to claim 3, wherein transetherification is conducted at a temperature from 100° to 150° C.

14. A method according to claim 5, wherein transetherification is conducted at a temperature from 100° to 150° C.

15. A method according to claim 6, wherein 1 to 15 mol % of the R radicals are transetherified.

16. A method according to claim 15, wherein 2 to 10 mol % of the R radicals are transetherified.

17. A method according to claim 7, wherein 1 to 15 mol % of the R radicals are transetherified.

18. A method according to claim 17, wherein 2 to 10 mol % of the R radicals are transetherified.

19. A method according to claim 8, wherein 1 to 15 mol % of the R radicals are transetherified.

20. A method according to claim 19, wherein 2 to 10 mol % of the R radicals are transetherified.

* * * * *